United States Patent [19]

Radeloff et al.

[11] Patent Number: 4,950,550
[45] Date of Patent: Aug. 21, 1990

[54] COMPOSITE MEMBER FOR GENERATING VOLTAGE PULSES

[75] Inventors: Christian Radeloff, Bruchkoebel; Gerd Rauscher, Alzenau; Hans Warlimont, Freigericht, all of Fed. Rep. of Germany

[73] Assignee: Vacuumschmelze GmbH, Fed. Rep. of Germany

[21] Appl. No.: 364,964

[22] Filed: Jun. 12, 1989

[30] Foreign Application Priority Data

Jul. 15, 1988 [DE] Fed. Rep. of Germany ....... 3824075

[51] Int. Cl.$^5$ ............................................. B32B 15/01
[52] U.S. Cl. ..................................... 428/611; 428/678; 428/679; 428/680; 428/928; 340/551; 340/572
[58] Field of Search ............... 428/611, 678, 679, 680, 428/928; 340/551, 572

[56] References Cited

U.S. PATENT DOCUMENTS

| 3,820,090 | 6/1974 | Wiegand | 428/611 |
| 4,247,601 | 1/1981 | Wiegand | 428/611 |
| 4,660,025 | 4/1987 | Humphrey | 340/572 |

FOREIGN PATENT DOCUMENTS

| 2933337 | 3/1981 | Fed. Rep. of Germany. |
| 3152008 | 7/1983 | Fed. Rep. of Germany. |

*Primary Examiner*—Theodore Morris
*Assistant Examiner*—George Wyszomierski
*Attorney, Agent, or Firm*—Hill, Van Santen, Steadman & Simpson

[57] ABSTRACT

A composite member particularly suited for anti-theft security systems is composed of a core of soft-magnetic material having a nickel-iron alloy (in weight percent) of 55 through 82 nickel, 0 through 4 molybdenum, the remainder iron, or an aluminum-iron alloy having 5 through 16% aluminum, the remainder iron, with a cobalt-vanadium-iron alloy or a cobalt-chromium-iron alloy envelope for the composite member.

18 Claims, 8 Drawing Sheets

COMPOSITE MEMBER FOR GENERATING VOLTAGE PULSES

BACKGROUND OF THE INVENTION

1. Field of the Invention

The present invention is directed to a composite element capable of generating voltage pulses when disposed in a magnetic field, and particularly to such a composite element suitable for use as a marker in an anti-theft security system.

2. Description of the Prior Art

A composite member for generating voltage pulses is described in German Patent No. 31 52 008 composed of a core and an envelope of two magnetic materials having different coercivity, with the core and envelope being mechanically stressed relative to one another by a thermal treatment. The hard magnetic part is composed of a Co-V-Fe alloy or of a Co-Cr-Fe alloy. For example, an alloy in the range of 45 through 55 weight percent cobalt, 30 through 50 weight percent iron and 4 through 14 weight percent (chrome + vanadium) is used for the magnetically hard material, whereas nickel is provided as the soft magnetic material.

This known composite member exists in the form of an elongated magnetic switch core.

German Published Application No. 2 933 337 also discloses a composite member composed of nickel or of unalloyed steel as a stressing component and a cobalt-vanadium-iron alloy as a magnetically active switch component. This composite member is employed for alarm systems. As described in this document, the goal is a high coercivity field strength of the switch components as a result of the iron-cobalt-vanadium alloy in order to be insensitive to disturbing fields. This requires a high detection field strength in alarm systems and thus limits the possible applications. Moreover, this known composite member cannot be deactivated by magnetic influencing.

An elongated composite member having a low response field strength of 1.0 Oe (about 0.8 A/cm) is also disclosed by U.S. Pat. No. 4,660,025 (Humphrey). For example, an elongated wire of amorphous material that is 7.6 cm long is used and it is recited therein that the length of this wire can be between 2.5 and 10 cm.

In this known security marker, however, short lengths of the marker can be realized only given an extraordinarily thin cross section, again resulting in an extremely low output pulse. The reason for this is that the shearing by the demagnetizing field, that is relatively large in comparison to the diameter given short marker lengths, does not permit an adequate Barkhausen discontinuity and thus an adequate sudden remagnetization, to be achieved. This amorphous security marker can likewise not be magnetically deactivated.

Extremely small diameters of these wires, however, have the disadvantage that — for example, given employment for anti-theft security markers — they cause only an extremely slight modification of the alternating field employed for triggering the alarm, so that correspondingly sensitive measuring instruments or greater lengths of the marker are required.

SUMMARY OF THE INVENTION

It is an object of the present invention to provide a deactivatable composite member that is suitable for use as an anti-theft security marker which has an extremely short length but still causes a relatively high output pulse in the anti-theft system.

This object is achieved by a specific combination of hard magnetic and soft magnetic alloys.

This structure has the advantage that wire having a high-strength envelope is obtained and that relatively short wires can be provided. The dimensions are selected such that, given a demagnetized permanent magnetic material (i.e., a demagnetized hard-magnetic envelope), the relatively high demagnetizing field prevents sudden remagnetization despite the stressing of the soft-magnetic core.

By magnetizing the hard-magnetic envelope, however, the magnetization characteristic shifts, so that demagnetization zones at the edge of the strip are largely avoided due to the flux in the hard-magnetic envelope. This causes a Barkhausen discontinuity to occur given remagnetization in one direction, but such a discontinuity is absent given remagnetization in the other direction.

Particularly for employment as anti-theft security strips, this property of the Barkhausen discontinuity appearing only given modifications of the detecting magnetic field in one direction has the additional advantage of enabling a better discrimination between the composite member and other magnetic materials that are situated in the detection zone, which could also influence the detection magnetic field.

DESCRIPTION OF THE PREFERRED EMBODIMENTS

In general, a de-activatable composite member suitable for use as an anti-theft security marker which has a short length but still causes a relatively high output pulse in the anti-theft system has been found to be achievable with the composite member consisting of a soft magnetic alloy core and a hard-magnetic alloy jacket, with the core and the jacket being mechanically stressed relative to each other by exposure to a temperature in the range of 500° C. -900° C. In general, the soft magnetic alloy core has a composition in weight percent of 55-82 nickel, 0-4 molybdenum, and the remainder iron including melt-conditioned impurities. In general, the hard-magnetic alloy jacket surrounding the core consists of either a Co-V-Fe alloy having a composition 48-52 cobalt, 4-14 vanadium, and the remainder iron including melt-conditioned impurities or a Co-Cr-Fe alloy having a composition 21-30 chromium, 4-23 cobalt, 0-3 molybdenum, 0-1.5 silicon and the remainder being iron including melt-conditioned impurities. The marker has a ratio of the cross-sections of the jacket and core which, in combination with the remanence of the jacket and the core causes the Barkhausen discontinuity to occur at a field strength having a maximum of 5 A/cm.

A further embodiment of a composite member having a short length but which causes a relatively high output pulse in the anti-theft system has, in general, a core having a composition in weight percent of 5-16 aluminum with the remainder being iron including melt-conditioned impurities, and a jacket having a composition which is either a Co-V-Fe alloy having a composition 48-52 cobalt, 4-8 vanadium, with the remainder being iron including melt-conditioned impurities, or a Co-Cr-Fe alloy as described above. In this embodiment, the core and the jacket are mechanically stressed relative to each other by exposure to a temperature in the range of 500° C. -500° C. Again, the ratio of the cross-sections of the jacket and the core, in combination with the remanence of the jacket and the core, causes the Barkhausen discontinuity to occur at a field strength having a maximum of 5 A/cm.

EXAMPLE 1.

A wire composed of a core of an alloy of 65% nickel, 3% molybdenum, the remainder iron, and a jacket composed of an alloy of 27.5% chromium, 10.5% cobalt, the remainder iron, was manufactured. The manufacture ensued by extruding stock having such a core and jacket composition, which was subsequently drawn to 0.2 mm diameter with intermediate annealing, and was continuously annealed at 800° C. with subsequent, rapid cooling in order to dismantle the stresses forming in the material. This wire was then subsequently heated for about 3 hours at a temperature of 560° C. Due to the higher coefficient of thermal expansion of the soft-magnetic alloy, a tensile stress arises in the core and a compressive stress arises in the jacket of the cooled wire.

The cross sectional ratio of jacket and core was selected at 2:1 and the diameter of the composite member amounted to 0.2 mm. A coil of 1000 turns was wound around this composite member and an output pulse of 0.4 V given a magnetized jacket and a frequency of 50Hz in the coil was obtained.

Figure 1:
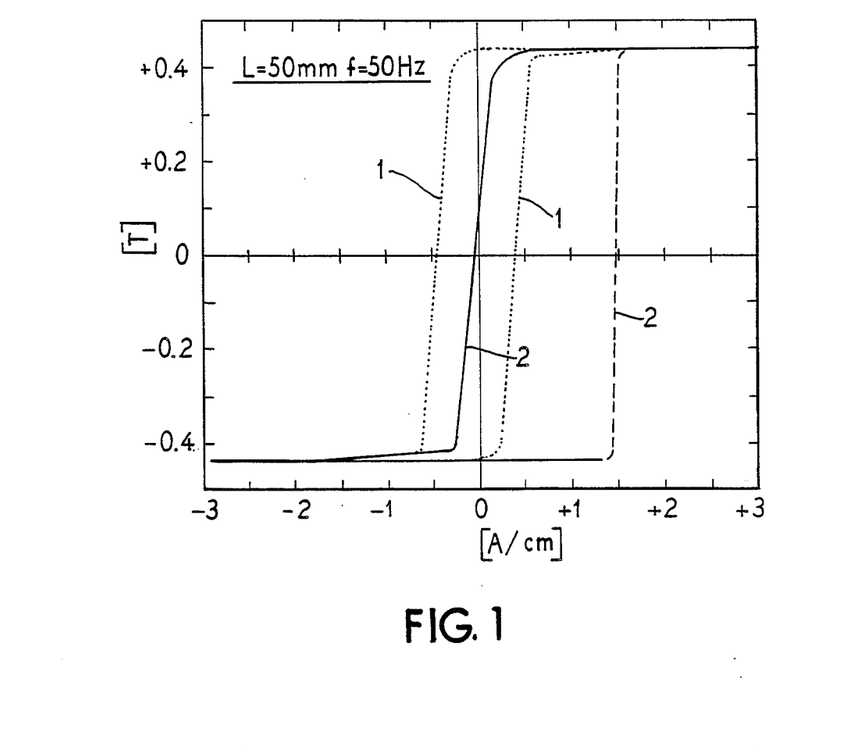
FIG. 1 shows hysteresis loops for a magnetized and demagnetized jacket in a composite wire having a composition in accordance with the principles of the present invention.

FIG. 1 shows the remagnetization loop with the induction in Teslas on the ordinate and the field strength in A/cm on the abscissa. Given a wire length of L=50 mm and a frequency of f=50 Hz, curve 1 shows the demagnetized condition of the hard-magnetic jacket. Curve 2 shows the course given a magnetized jacket. The right, broken line of curve 2 shows the sudden remagnetization given a field strength of about 1.5 A/cm.

Figure 2:
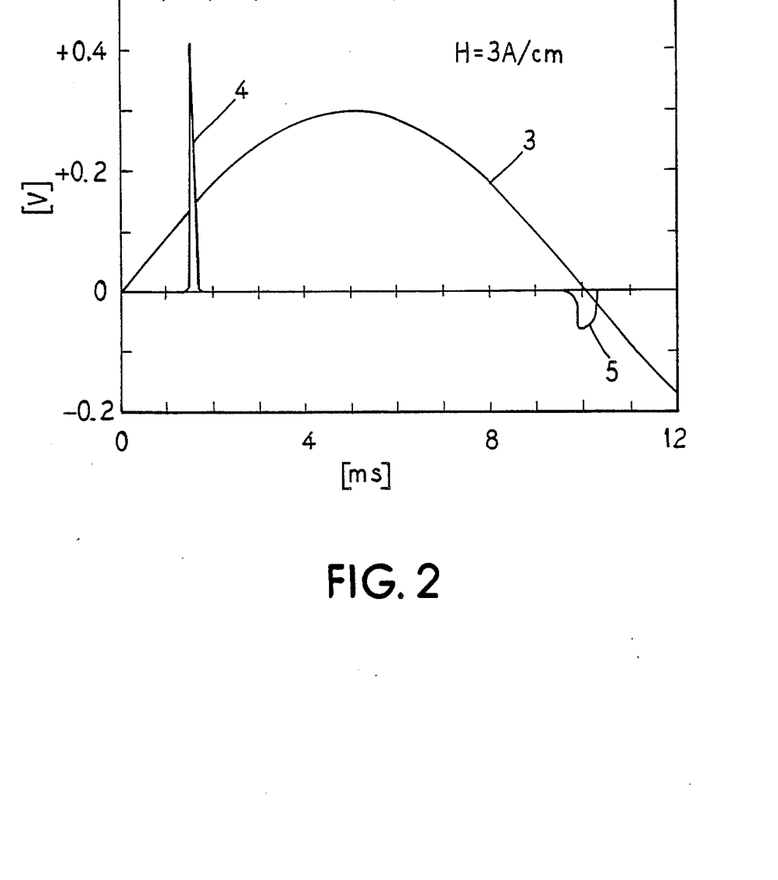
FIG. 2 shows a voltage curve for the wire of FIG. 1 disposed in a detection field.

FIG. 2 shows the associated voltage curve. The wire was exposed to a sinusoidal field of 50 Hz having a maximum field strength of 3 A/cm according to curve 3.

The pulse voltage is also entered over the time in milliseconds. It was generated in a coil with 1000 turns that was wound around the wire.

Curve 4 shows a high, narrow pulse and curve 5 shows a smaller, negative pulse that results upon remagnetization without Barkhausen discontinuity.

Figure 3:
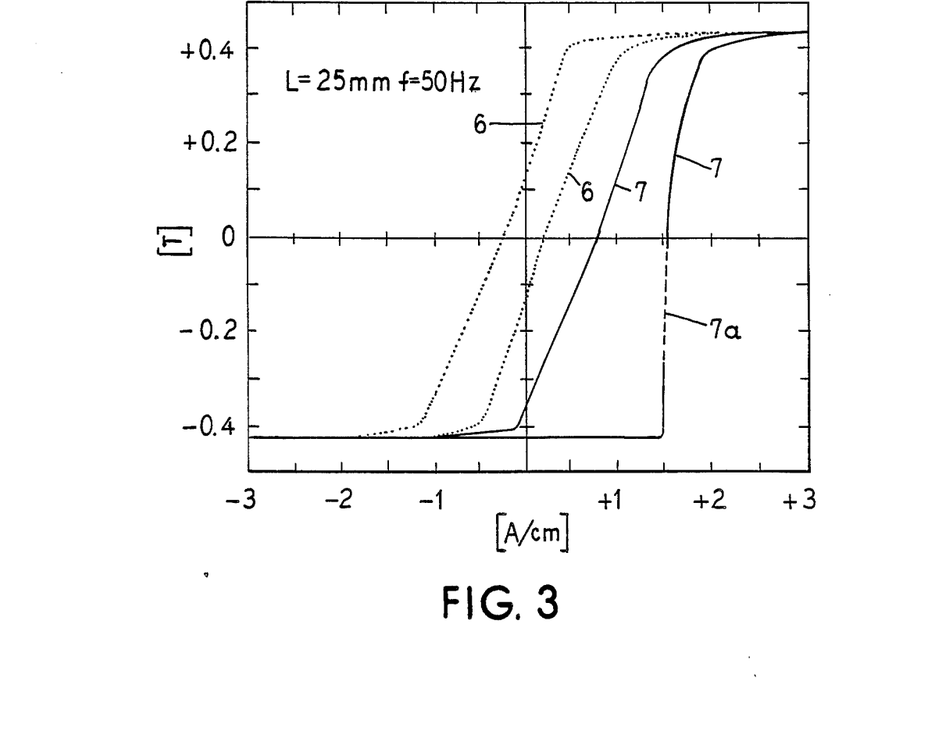
FIG. 3 shows hysteresis loops for a shortened wire having a composition in accordance with the principles of the present invention.

When the wire is shortened to a length of 25 mm under conditions that are otherwise identical, one can see in FIG. 3 that the demagnetizing field results in a shearing of the characteristic. The hysteresis loop is shown dotted as curve 6 for that case wherein the outer jacket is not magnetized. Curve 7 shows the hysteresis loop given a magnetized jacket. The part of the curve 7 that experiences a sudden magnetization is again shown with broken lines and is referenced as curve 7a.

Figure 4:
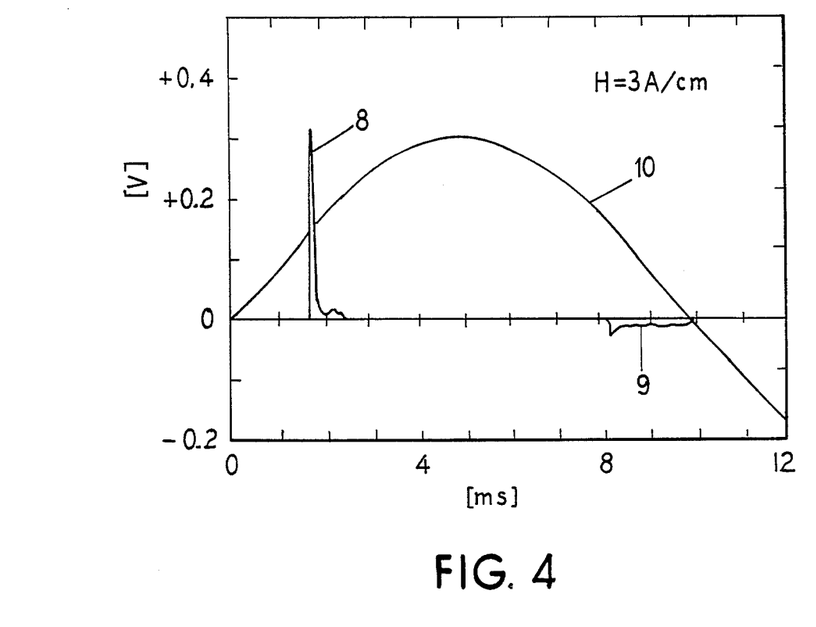
FIG. 4 shows an output voltage curve for the wire of FIG. 3 disposed in a detection field.

FIG. 4 shows the resulting voltage curve. One can see that an adequately large pulse is generated even given the shortened length. According to curve 8, a short voltage pulse of about 0.3 V arises, as does a remagnetization pulse according to curve 9, which is further diminished in comparison to the voltage pulse of curve 5 in FIG. 2 because of the shearing. As in the case of the longer wire, an exciting field shown as curve 10 and having a maximum field strength of 3 A/cm was applied.

Figure 6:
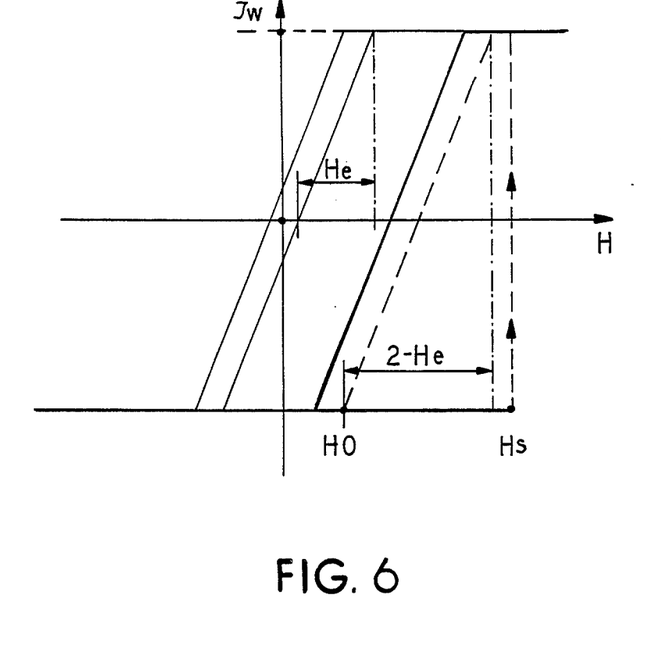
FIGS. 6 and 7 show the relationship between the switching field strength and the coercive field strength for the different wire lengths corresponding to FIGS. 1 and 3.
Figure 7:
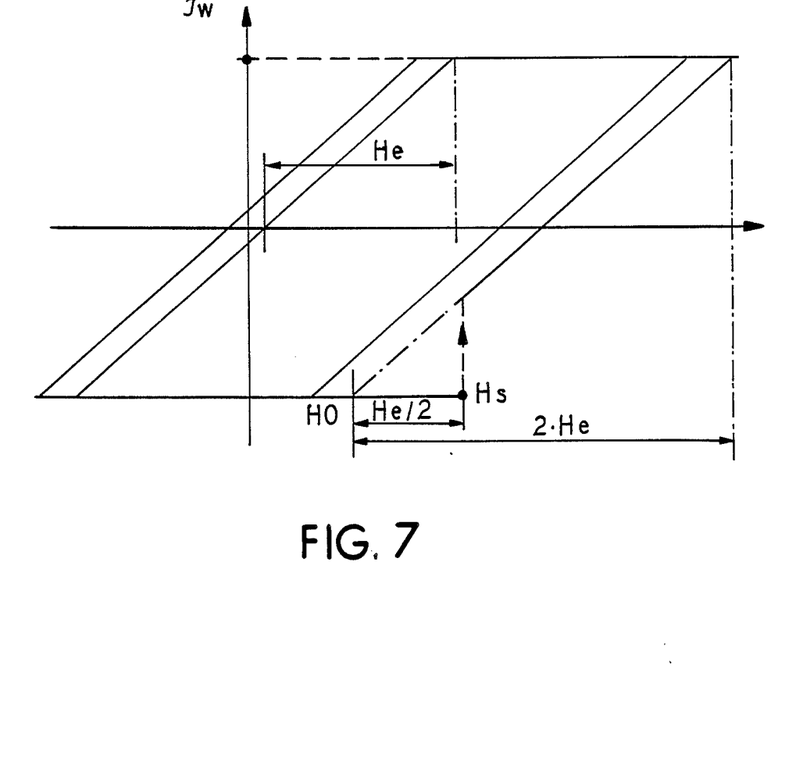

In comparison, FIGS. 6 and 7 show the relationship between the demagnetization field strength essentially established by the length and by the diameter of the wire in relationship to the coercive field strength. The demagnetization field strength is referenced He and the coercive field strength is reference HO, whereas the field strength at which the Barkhausen discontinuity occurs is indicated as Hs. The induction Jw of the soft-magnetic material in comparison to the field strength H is entered in each of FIGS. 6 and 7.

The thin, solid-line curves represent the magnetization loop given a demagnetized permanent magnetic material, i.e., given a demagnetized jacket, whereas the thick solid-line curves are valid for the case of a magnetized jacket. The thin, broken line shows the course of the hysteresis loop that would arise given a magnetized jacket without stressing the core, and the thick, broken line identified the field strength Hs at which the Barkhausen discontinuity occurs.

It is assumed in FIG. 6 that the difference between the switching field strength Hs and the coercive field strength HO is greater than twice the amount of the demagnetization field strength He. The field strengths HO + He given a demagnetized jacket and HO + 2He given a magnetized jacket are entered as dot-dash lines in FIG. 6, as the correspondingly referenced arrows He and 2He show. One can see that the thick, broken-line at the switch field strength Hs is situated to the right of the dot-dash line 2He, so that the length-to-diameter ratio with the given pulse wire could still be modified in the direction of a thicker diameter or of a shorter length without diminishing the pulse triggered by the Barkhausen discontinuity.

FIG. 7 shows the same relationships given a wire having a shorter length or a larger diameter, whereby the length-to-diameter ratio was optimized to such an extent that an adequately high voltage pulse is still present given an optimally short length. The thick, broken line for identifying the switch field strength Hs has a distance of half the demagnetization field strength from the coercive field strength given magnetized envelope, this being referenced with the arrow He/2. The Barkhausen discontinuity still amounts to about 25% of the overall induction increase and it has been shown that this yields an adequate measure for employment in anti-theft security systems. This means that the length of the wire in relationship to the diameter with given material constituents can be selected such that the switch field strength lies above the coercive field strength by at least half the demagnetization field strength, given a magnetized envelope.

EXAMPLE 2.

In a further example, a hard-magnetic alloy having 27.5% chromium, 10.5% cobalt, the remainder iron (all in weight percent) was used, together with a soft-magnetic nickel-iron alloy that contains 47.5% nickel and the remainder iron. The treatment was executed in the same fashion as in Example 1 and a composite member that did not exhibit noteworthy Barkhausen discontinuity was obtained, i.e., no sudden remagnetization occurred even given a magnetized envelope.

Figure 5:
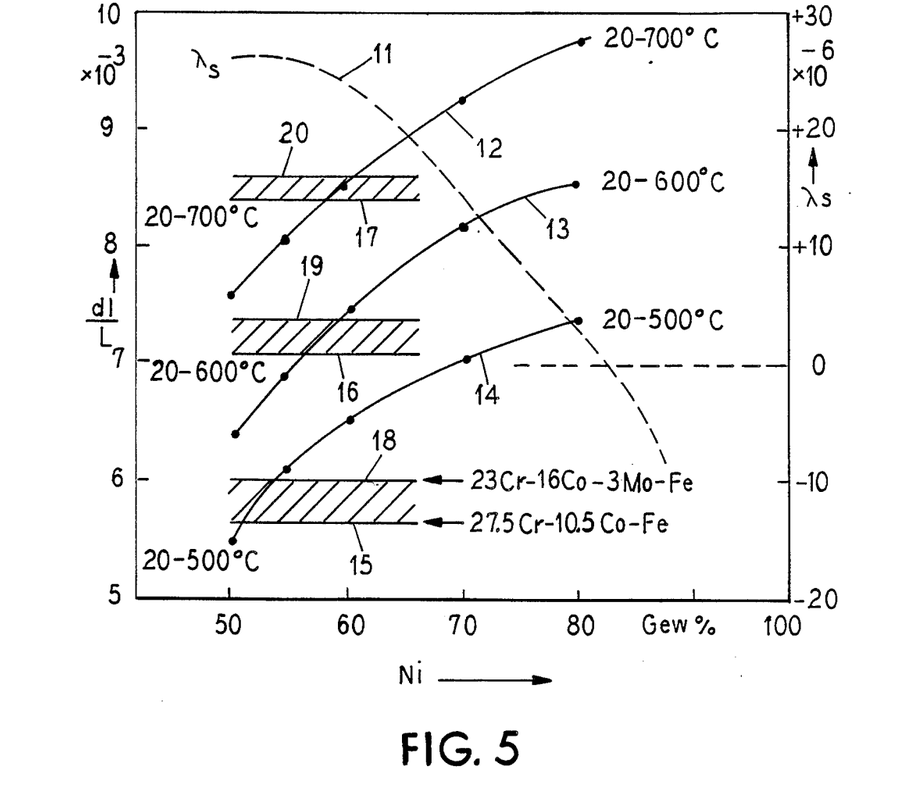
FIG. 5 shows the relationship between the nickel content and the relative length change and magnetostriction of a further composition in accordance with the principles of the present invention.

The cause for this may be seen from the diagram of FIG. 5. In this diagram, the nickel content of the soft-magnetic materials used is entered in weight percent on the abscissa and the relative length change dl/L as well as the magnetostriction λs are entered on the ordinate.

The scale for the magnetostriction applied to the curve 11 shown with broken lines and reference λs whereas the length changes of the soft-magnetic materials are shown as curve 12 for heating from 20° to 700° C., as curve 13 for a change from 20° through 600° C. and as curve 14 for heating from 20° through 500° C.

In curve 15, the length changes of the hard-magnetic materials being employed show the length changes of the hard-magnetic material having (in weight percent) 27.5% chrome, 10.5% cobalt, the remainder iron, for the case of a heating from 20° to 500° C. Curve 16 shows changes for the case of heating from 20° through 600° C. and curve 17 shows changes for the case of heating from 20° through 700°. Curves 18, 19 and 20 reproduce the relationship for heating to 500°, 600°, 700° C. of the hard-magnetic material having (in weight percent) 23% chromium, 16% cobalt, 3% molybdenum, the remainder iron.

Since the nickel content was only varied for the soft magnetic materials, the curves 15 through 20 in the diagram are present as horizontal straight lines. The space between the horizontal straight lines of various hard-magnetic materials given the same heating is shown shaded. The shaded regions thus roughly identify the expansion that occurs as the hard-magnetic materials come into consideration.

Given Example 2 having 47.5% nickel, one can see that the thermal expansion for all temperatures entered in the diagram of FIG. 5 lies below that of the hard-magnetic constituents employed. This results in the final heat treatment producing no tensile stress in the soft-magnetic material, so that no Barkhausen discontinuity is to be anticipated given positive magnetostriction according to curve 11. On the contrary, this is only the case beginning with a nickel content of 52% for the soft-magnetic constituent and was also capable of being demonstrated at the examples identified in FIG. 5 by dots.

When the nickel content is increased above about 82%, a positive magnetostriction of the material is no longer present and a pulse is therefore not generated given a composite wire of the invention.

EXAMPLE 3.

A hard-magnetic alloy having (in weight percent) 52% cobalt, 8% vanadium, the remainder iron was used together with a soft-magnetic alloy having (in weight percent) 66% nickel, 3% molybdenum, the remainder iron. This alloy was again brought to its ultimate diameter by extrusion and drying and was then continuously annealed at 750° C. and subsequently rapidly cooled. This material combination offers the special advantage that an adequate mechanical stressing and, thus, a good pulse output was achieved even without additional, stationary thermal treatment.

The described combinations for hard-magnetic and soft-magnetic alloys have the advantage that the response field strength is 1 through 2 A/cm, whereas it is 16 through 20 A/cm in the case of conventional Wiegand wire. Response field strengths that are otherwise obtained only given long, amorphous wires (see U.S. Pat. No. 4,660,025 of Humphrey) are thus obtained, so that composite members composed of the described material combinations are especially suited for employment in anti-theft security systems. These composite members, differing from the amorphous wire, are additionally activatable or deactivatable by the permanent magnetic components that are necessarily present.

Figure 8:
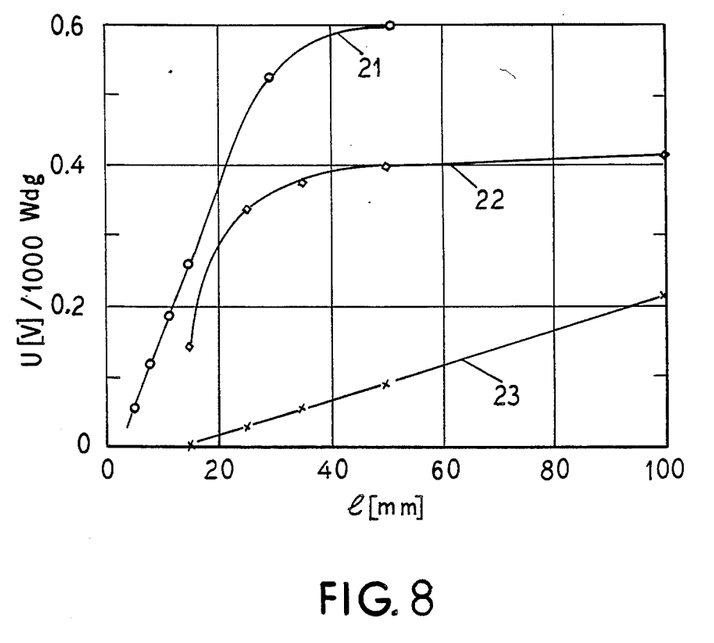
FIG. 8 shows the various output voltages which are obtainable for the different compositions disclosed in the present specification.

The obtainable voltages in the described examples dependent on the wire length are entered in FIG. 8 for different diameters. The abscissa shows the measured pulse voltage in volts given a pick-up coil having 1000 turns and the length I of the wire in mm is entered on the abscissa. Curve 21 thus relates to the described composite member having a diameter of 0.15 mm. Curve 22 shows the voltages when the diameter amounts to 0.2 mm and, for comparison, the amorphous wire having a diameter of 0.13 mm known from U.S. Pat. No. 4,660,025 is shown in curve 23. The measurements graphically shown in FIG. 8 were made at a frequency of 50 Hz and with a sinusoidal field strength variation having a maximum of Hmax = 3 A/cm. The curves show that, given a lower detection field strength, significantly greater wire lengths are needed in the known amorphous wire in order to obtain the same output voltage of the generated pulses.

An extremely low response field strength is also obtained when an aluminum-iron alloy is selected instead of a nickel-iron alloy. When the aluminum content is varied between 5 and 16% in weight percent, an extremely soft-magnetic material is obtained whose expansion behavior likewise lies above the expansion coefficient of the hard-magnetic alloys employed. Such composite members yield even lower response field strengths than the nickel-iron alloys that were set forth in detail.

Due to the short length in relationship to the cross section, all described composite members have no skip function for the remagnetization when the outer, hard magnetic envelope is not magnetized. They can therefore be deactivated by demagnetizing the hard-magnetic envelope. For example, the remagnetization loan be carried out with a simple, strong magnet when the magnetic field of this magnet is perpendicular to the longitudinal direction of the composite member. The application of this deactivation method makes it unnecessary to employ a decaying alternating magnetic field in longitudinal direction of the composite member.

Due to the good malleability of the materials, the composite member of the invention can also be produced by rolling the wire composite member present to make a strip or ribbon. The strip form has the advantage that the composite member is significantly less sensitive to curvatures and can therefore is especially suited for flexible labels of anti-theft security systems.

Although modifications and changes may be suggested by those skilled in the art it is the intention of the inventors to embody within the patent warranted hereon all changes and modifications as reasonably and properly come within the scope of their contribution to the art.

WE CLAIM AS OUR INVENTION:

1. A composite marker element for generating a voltage pulse in the presence of a detection field, said marker element comprising:
   a soft-magnetic alloy core having a composition in weight percent of 55–82 nickel, 0–4 molybdenum, the remainder iron including melt-conditioned impurities;
   a hard-magnetic alloy jacket surrounding said core having a composition selected from the group consisting of a Co-V-Fe alloy having a composition 48–52 cobalt, 4–14 vanadium, the remainder iron including melt-conditioned impurities, and a Co-Cr-Fe alloy having a composition 21–30 chromium, 4–23 cobalt, 0.3 molybdenum, 0–1.5 silicon, the remainder iron including melt-conditioned impurities; and
   said core and said jacket having been mechanically stressed relative to each other by exposure to a temperature in the range of 500°–900° C.

2. A composite marker element as claimed in claim 1, wherein each of said jacket and said core has a cross-section and a remanence induction, and wherein the ratio of the cross-section of the jacket to the cross-section of the core is greater than 0.8 times the ratio of the remanence induct on of the core to the remanence induction of the jacket.

3. A composite marker element as claimed in claim 1, having a length less than or equal to 50 mm.

4. A composite marker element as claimed in claim 1, wherein said marker has a length such that the magnetic field strength at which the Barkhausen discontinuity of said marker occurs is in a range between half the saturation field strength of its demagnetizing field through twice the saturation field strength of its demagnetizing field.

5. A composite marker element as claimed in claim 1, wherein said marker is in wire form.

6. A composite marker element as claimed in claim 1, wherein said marker is in strip form.

7. A composite marker element as claimed in claim 1, wherein said jacket and said core each have a cross-section and a remanence, and wherein said marker has a ratio of the cross-sections of the jacket and the core which in combination with the remanence of the jacket and the core causes the Barkhausen discontinuity to occur at a field strength having a maximum of 5 A/cm.

8. A composite marker element as claimed in claim 1, wherein said jacket has a cross-section and a remanence, and wherein said cross-section of said jacket in said marker is selected in combination with the remanence of said jacket in its magnetized condition such that the Barkhausen discontuity for said marker occurs at a field strength between 1 and 2 A/cm.

9. A composite marker element as claimed in claim 1, wherein said marker has a longitudinal axis and wherein said jacket is demagnetizeable by a magnetic field oriented perpendicularly relative to said longitudinal axis.

10. A composite marker element for generating a voltage pulse in the presence of a detection field, said marker element comprising:
    a soft-magnetic alloy core having a composition in weight percent of 5–16 aluminum, the remainder iron including melt-conditioned impurities;
    a hard-magnetic alloy jacket surrounding said core having a composition selected from the group consisting of a Co-V-Fe alloy having a composition 48–52 cobalt, 4–8 vanadium, the remainder iron including melt-conditioned impurities, and a Co-Cr-Fe alloy having a composition 21–30 chromium, 4–23 cobalt, 0–3 molybdenum, 0–1.5 silicon, the remainder iron including melt-conditioned impurities; and
    said core and said jacket having been mechanically stressed relative to each other by exposure to a temperature in the range of 500°–700° C.

11. A composite marker element as claimed in claim 10, wherein each of said jacket and said core has a cross-section and a remanence induction, and wherein the ratio of the cross-section of the jacket to the cross-section of the core is greater than 0.8 times the ratio of the remanence induction of the core to the remanence induction of the jacket.

12. A composite marker element as claimed in claim 10, having a length less than or equal to 50 mm.

13. A composite marker element as claimed in claim 10, wherein said marker has a length such that the magnetic field strength at which the Barkhausen discontinuity of said marker occurs is in a range between half the saturation field strength of its demagnetizing field through twice the saturation field strength of its demagnetizing field.

14. A composite marker element as claimed in claim 10, wherein said marker is in wire form.

15. A composite marker element as claimed in claim 10, wherein said marker is in strip form.

16. A composite marker element as claimed in claim 10, wherein said jacket and said core each have a cross-section and a remanence, and wherein said marker has a ratio of the cross-sections of the jacket and the core which in combination with the remanence of the jacket and the core causes the Barkhausen discontinuity to occur at a field strength having a maximum of 5 A/cm.

17. A composite marker element as claimed in claim 10, wherein said jacket has a cross-section and a remanence, and wherein said cross-section of said jacket in said marker is selected in combination with the remanence of said jacket in its magnetized condition such that the Barkhausen discontuity for said marker occurs at a field strength between 1 and 1 a/cm.

18. A composite marker element as claimed in claim 10, wherein said marker has a longitudinal axis, and wherein said jacket is demagnetizeable by a magnetic field oriented perpendicularly relative to said longitudinal axis.

* * * * *